Feb. 15, 1966      M. I. GLASS ETAL      3,235,253
COMBINED ROCKING AND ROTATABLE AMUSEMENT DEVICE
Filed Jan. 8, 1964                3 Sheets-Sheet 1
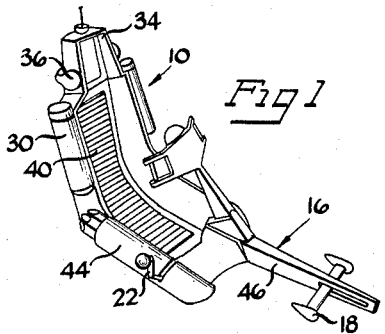
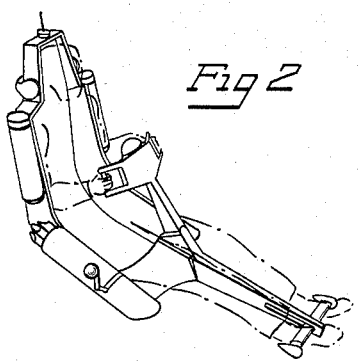
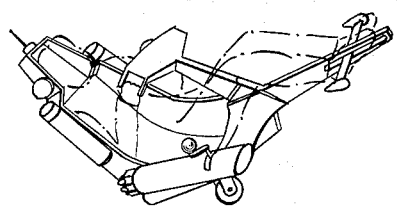
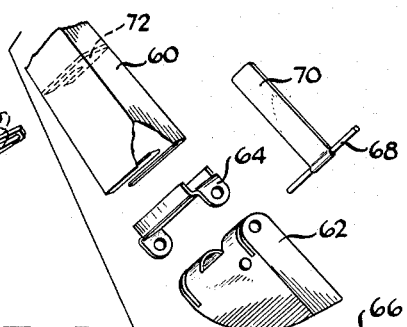
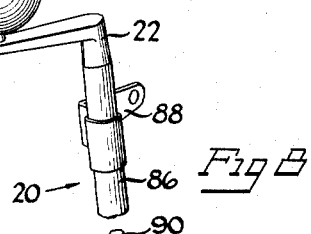
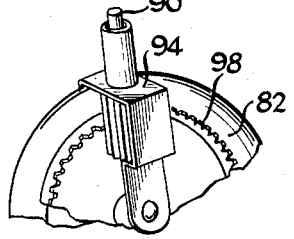
Inventors
MARVIN I. GLASS
GUNARS LICITIS
NORMAN T. McFARLAND Feb. 15, 1966   M. I. GLASS ETAL   3,235,253
COMBINED ROCKING AND ROTATABLE AMUSEMENT DEVICE
Filed Jan. 8, 1964   3 Sheets-Sheet 2
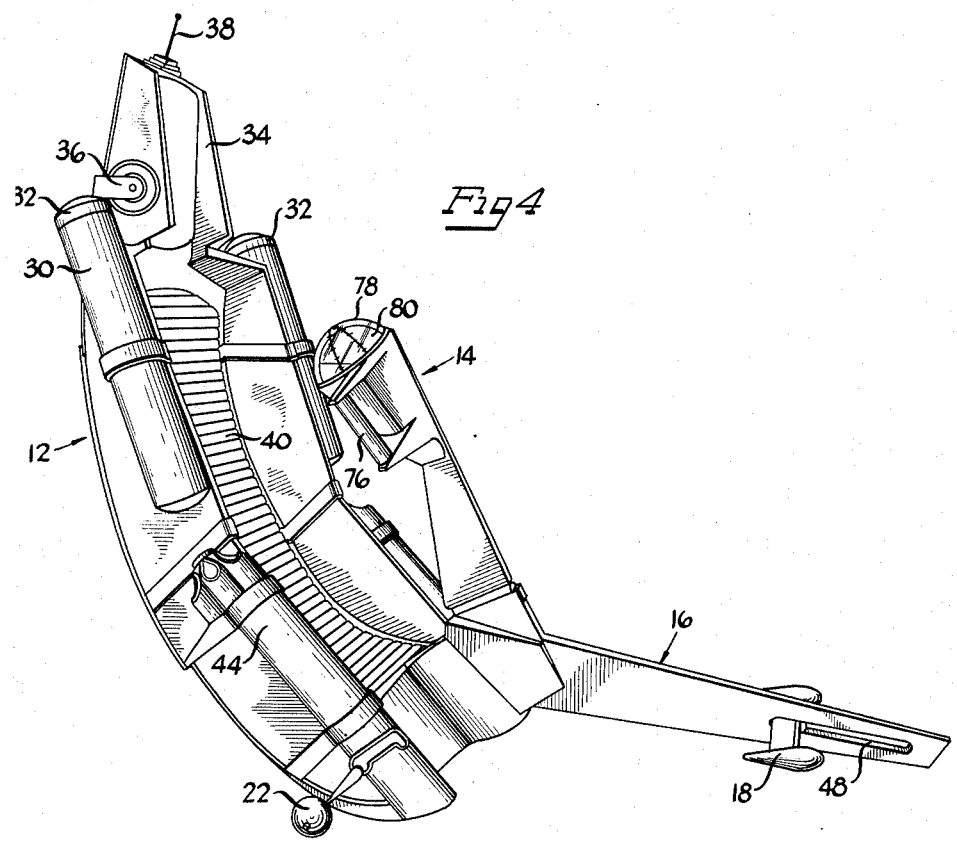
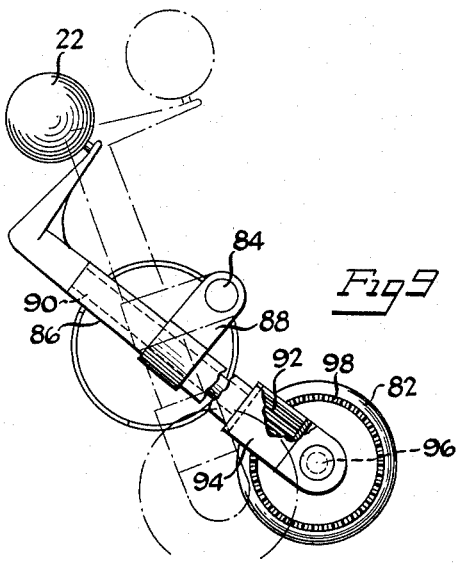
Inventors
MARVIN I. GLASS
GUNARS LICITIS
NORMAN T. McFARLAND
By Anderson, Luedeka, Fitch, Even & Tabin
Attys

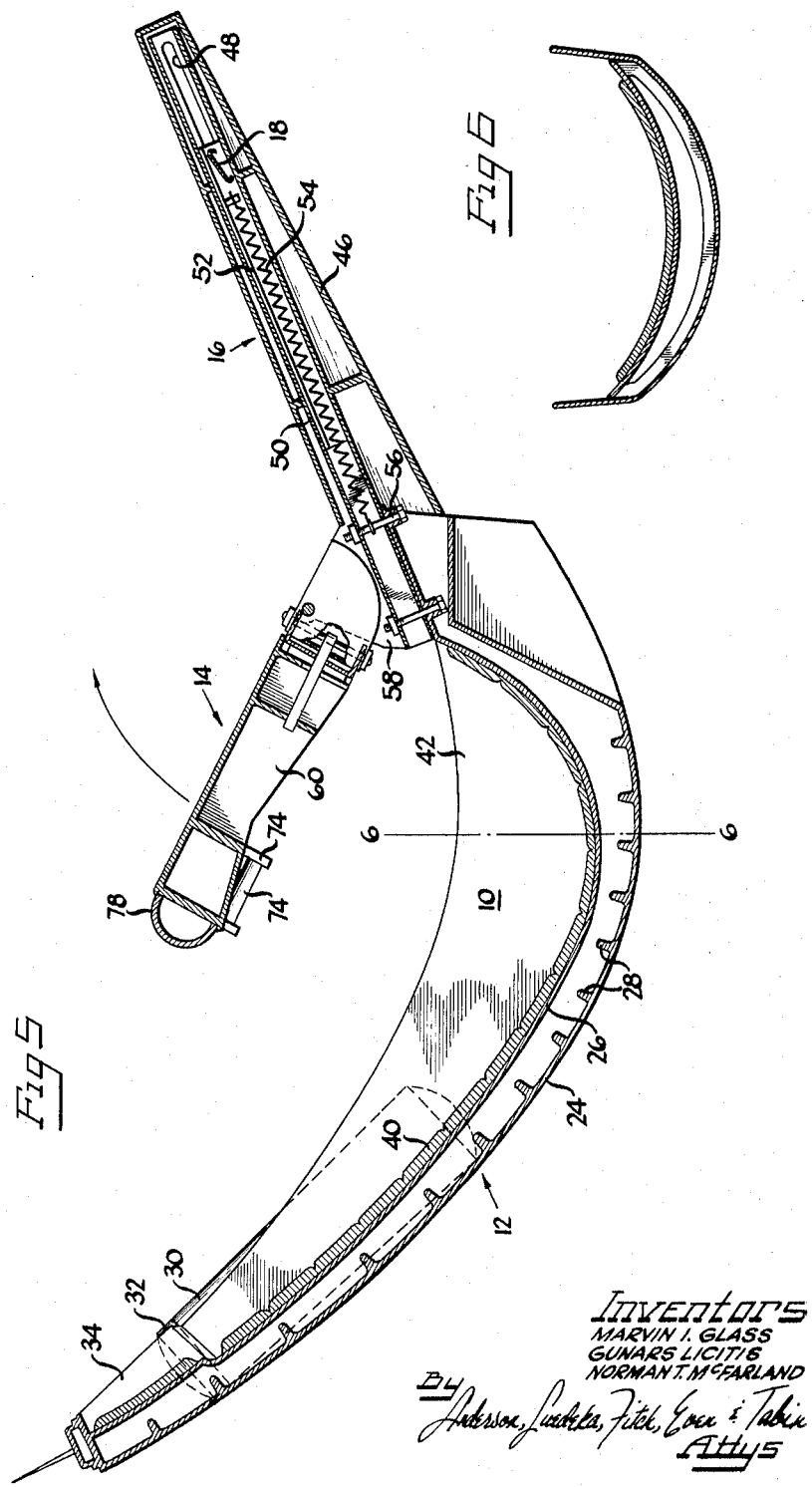

United States Patent Office 3,235,253
Patented Feb. 15, 1966

3,235,253
COMBINED ROCKING AND ROTATABLE AMUSEMENT DEVICE
Marvin I. Glass, Chicago, Gunars Licitis, Lombard, and Norman T. McFarland, Mayview, Ill., assignors to Marvin Glass & Associates, Chicago, Ill., a partnership
Filed Jan. 8, 1964, Ser. No. 336,525
4 Claims. (Cl. 272—33)

The present invention relates generally to an amusement and exercising device, and is more particularly directed to such a device which simulates a trainer for an astronaut.

With the current interest in space travel and astronauts, children have a particular interest in amusement devices which relate to the space age. Further, it has been demonstrated through recent years the children are also especially interested in amusement devices and toys which permit them to participate in some activity rather than merely be a spectator to the action of the toy. The present invention is particularly concerned with the provision of an amusement device which fulfills both of these requirements. Moreover, the device disclosed herein provides an additional benefit to the child in that it requires exercise movements of the child's body and limbs and also serves to teach the child coordination of body movements and balance.

It is the primary object of this invention to provide a novel amusement device involving active and continuous participation by a child. A further object of the invention is the provision of such device in the form of a simulated astronaut trainer seat, wherein the child can experience motions similar to those experienced by an astronaut in flight. A further object of the invention is the provision of a body supporting seat or shell which permits essentially universal rocking movement of the occupant and provides means whereby the occupant can control such movement to a degree by flexing motions of the arms and legs.

A more detailed object of the invention is to provide a supporting seat having essentially a continuously curved surface for engagement with a plane supporting surface and including leg supporting means and hand engaging means, each of which are movable relative to the seat, so that shifting of the occupant's feed and arms relative to the seat will effect rocking and tilting motion of the seat. Still another object is to provide such a device which includes means for frictionally engaging the supporting surface at a position spaced from the position of support for the seat, which friction engaging means is operable to effect rotation of the seat. Additional objects will be apparent from the following disclosure of a preferred embodiment of the invention as illustrated in the drawings, wherein:

FIGURE 1 is a perspective view of the device;

FIGURE 2 is similar to FIGURE 1 and illustrates the position of the occupant in the trainer;

FIGURE 3 illustrates the action of the trainer seat when the ground engaging wheel is operated;

FIGURE 4 is an enlarged perspective view of the device;

FIGURE 5 is an enlarged longitudinal cross-section of the device;

FIGURE 6 is a section taken generally along line 6—6 in FIGURE 5;

FIGURE 7 is an enlarged, exploded view illustrating the connection between the hand control and the seat proper;

FIGURE 8 is an enlarged view, partially in section and with parts broken away, of the ground engaging wheel provided for the device; and FIGURE 9 is another fragmentary view of the ground engaging wheel with parts broken away.

With reference first to FIGURES 1–4, it is seen that the amusement and exercising device provided by the present invention comprises generally a simulated astronaut trainer seat 10 which may be in the form of a molded plastic shell with the seat and back rest portions integrally formed. The under or outwardly facing surface of the trainer is curved both along its longitudinal and transverse axes to present a generally convex surface, as noted particularly in FIGURES 5 and 6, so as to afford rocking and tilting motion in any direction and also to permit rotation of the trainer seat. Immediately forward of the seat supporting section is a hand control device 14 which is movable about a pair of transverse axes, so as to enable the occupant to shift his arms and to some extent his body forwardly and rearwardly, as well as laterally. A forwardly extending beam structure 16 is fixed to the front of the seat portion and is provided with a transverse bar 18 for support of the occupant's fet. This transverse bar 18 is spring biased in a rearward direction and enables the occupant to shift his legs fore and aft of the seat. Furthermore, there is provided on at least one side of the seat a wheel structure 20 which is movable generally vertically with respect to a position of ground engagement, and which is rotatable through operation of a crank device 22.

It is seen, therefore, that the disclosed device permits rocking and tilting movement of the trainer seat and its occupant, as the latter manipulates the hand and feet controls 14 and 18, and also provides for rotary and/or sliding movement of the device across its supporting surface as the ground engaging wheel structure 20 is operated. Due to the curvature of the bottom surface 12 of the seat, the occupant can readily assume positions wherein his head is lowered considerably with respect to his feet (FIGURE 4), while at the same time effecting manipulation of the trainer to provide for sensations similar to those experienced by an astronaut in flight.

With reference now to FIGURES 4–5, it is to be noted that the trainer proper is essentially an integral unit which is preferably molded of plastic, but which may be of any other suitable material. The trainer seat is a somewhat elongated body in order to provide a continuous support for the back and head, and the outer or ground supporting surface of the trainer includes generally elliptical surfaces with respect to both its longitudinal and its transverse axes. The upper section has a somewhat reduced curvature along the longitudinal axis as compared to the curvature of the lower portion. In the preferred embodiment, the seat and back supporting portions are in the form of a plastic shell having an outer wall 24 providing a smooth outer surface, an inner wall 26, and ribs 28 extending inwardly from the outer wall to provide additional strength for the trainer body. Adjacent each side of the trainer at its upper portion are a pair of tubular members 30 which are preferably detachably mounted on the seat, and these members 30 are in the form of hollow canisters with removable top portions 32 to provide for insertion of simultated supplies, code messages and the like. The head supporting portion 34 is provided with simulated earphones 36 and an antenna 38 to give the child the effect of having means of communication. The interior or seating surface 40 of the trainer is preferably padded with foam plastic or the like and side walls 42 extend upwardly from the curved bottom surface to provide lateral support for the occupant.

Adjacent the lower seat portion of the trainer and at either side thereof are an additional pair of tubular members 44 which are preferably fixed to the trainer and which simulate rocket devices. At least one of these rocket devices 44 provides the support for the ground engaging wheel 20. Extending forwardly from the seat is a hollow beam member 46 (FIGURE 5), which may be also of plastic, with transverse internal ribs providing additional strength for the beam. The beam 46 extends along a path generally parallel to an extension of the line of curvature for the bottom, and the forward end of the beam includes aligned transverse slotted openings 48 receiving the cross bar 18 which provides the support for the feet of the occupant. This cross bar is preferably additionally supported by means of an elongated tubular member 50 which is disposed inside of the beam 46 and which telescopically engages an inner tubular member 52 fixed to a central portion of the cross bar 18 and extending rearwardly therefrom. A coil tension spring 54 is disposed within this inner tubular member 52 and is fixed at one end to the cross bar 18 and at the other end to a bolt 56 or the like providing the connection between the beam structure 16 and the trainer seat proper. The coil spring 54 places the cross bar 18 in tension, so that it is constantly urged rearwardly along the beam.

Interconnected with the rearward portion of the beam structure 16, as by means of a vertically extending bracket 58, is the hand control device 14. As seen particularly in FIGURE 7, the hand control device consists of a generally vertically extending frame member or post 60 which is coupled with the supporting bracket 58 by a pair of yokes 62 and 64 interconnected respectively by pins 66 and 68 which thereby afford movement of the post about the transverse axes provided by such pins. The pin 66 provides for swinging the post 60 away from the seat to permit entry into the seat, and the post is then moved toward the seat into its operative position seen in FIGURES 1–5. A flat leaf spring 70 is fixed at one end to the upper pin 68 and bears against a slotted transverse rib 72 in the post so as to bias the post 60 into a generally erect position relative to the longitudinal axis of the astronaut trainer. The upper end of the post 60 is formed with laterally projecting portions 74 including a bar 76 at each end to be grasped by the hands of the occupant of the trainer. The center of the post 60 is provided with a "navigation aid" in the form of a transparent ball 78 in which a miniature world globe 80 is floated in a liquid. The outer surface of the ball 78 has a vertical and a horizontal line marked on it to provide a reference for the globe movement which will occur incident to the tilting and rotation of the trailer.

Looking now at FIGURES 3, 8 and 9, it is seen that the wheel structure 20 includes a ground engaging wheel 82 and the latter is supported on one of the rocket devices 44 by means of a generally longitudinally extending stub shaft 84 (FIGURE 9) for swinging movement transversely of the trainer between a position of ground engagement and an elevated position permitting free lateral rocking movement of the trainer. More particularly, the wheel means 20 includes an elongated tubular housing 86 which is secured to the stub shaft 84 by means of a bracket member 88 for swinging movement about the axis of the stub shaft. As noted in FIGURE 3, stub shaft 84 is disposed to position the wheel at an angle with respect to the longitudinal axis of the trainer which will provide for rotation of the trainer when the wheel is lowered into engagement with the ground or floor and rotated. The tubular housing 86 receives an elongated shaft 90 which has a spur gear 92 fixed at its lower end and the rotatable handle 22 fixed to its upper end. The spur gear 92 is disposed within a yoke-like member 94 fixed to the lower end of the tubular housing 86, and extended portions of the yoke include aligned openings for receiving a shaft 96 fixed to the ground engaging wheel 82. Adjacent the outer portion of the wheel periphery is formed a ring gear 98 in position for engagement with the spur gear 92 on the rotatable shaft 90. Consequently, as the handle 22 is rotated, the wheel 82 is rotated and thereby the trainer is rotated about its position of support on the floor or ground.

Consequently, it is seen that there is provided herein a novel form of amusement device which affords entertainment and also exercise for a child. In summary, the trainer device 10 provides for easy entry into the trainer seat by moving the handle post 14 forwardly and away from the seat. As the occupant positions himself in the seat, he draws the handle post toward him and places his feet on the transverse bar 18. In the normally erect position, the trainer will be disposed essentially as seen in FIGURE 3, with the forward end of the beam 16 on or adjacent to the supporting floor surface. By drawing his legs rearwardly and shifting the weight of his body, the occupant can cause the trainer to tilt rearwardly toward a position wherein the back rest engages or closely overlies the supporting surface. The curvature of the bottom, of course, permits easy rocking between these two positions. Then too, by shifting the weight of his body sideways, assisted by movement of the arms and corresponding movement of the hand control structure, the occupant can cause the trainer to tilt laterally. In this respect, the side wall portions 42 on the trainer seat help to maintain the occupant in his seat and also to take the lateral thrust of the occupant's body and thereby assist in the lateral tilting movement.

Since the support for the trainer is in the nature of a single point support, essentially universal rocking and tilting motion is possible. Furthermore, the wheel 82 disposed along one side of the trainer can be lowered into engagement with the supporting surface and, through movement of the handle 22, the wheel can be rotated to provide an off-center or eccentric force on the trainer which will cause the latter to rotate about its position of support. Consequently, depending upon the maneuvering of the occupant in shifting of his weight, various motions and gyrations can be achieved. Additional interest is provided by the floating globe on the handle 14 which is intended to simulate the earth as viewed by a man in space.

Although shown and described with respect to particular apparatus and materials, it will be apparent that various modifications might be made without departing from the principles of this invention.

What is claimed is:

1. An amusement device comprising a seat forming member having an integrally formed and essentially continuous seat and back-rest sections, said member having a generally convex outwardly facing surface which is curved along essentially the entire length of its longitudinal axis and also transversely across substantially the entire width, an elongated leg supporting frame structure fixed to said seat section in forwardly and upwardly inclined relation to a central portion thereof, means carried by said device in position for easy engagement by the hands of an occupant, said means including a post member secured to said device generally centrally of the forward portion of said seat section in upwardly extending relation thereto, whereby said device can be supported on a flat surface and the occupant thereof can rock the device longitudinally and laterally, said rocking movement being achieved through shifting of the weight of the occupant, and a rotatable member carried on one side of said device and movable into a position of engagement with the supporting surface, said rotatable member being operable to effect rotation of said device about a generally vertical axis.

2. An amusement device comprising a seat forming member having an integrally formed and essentially continuous seat and back-rest sections, said member having a generally convex outwardly facing surface which is curved along essentially the entire length of its longitudinal axis and also transversely across substantially the entire width, an elongated leg supporting frame structure fixed to said seat section in forwardly and upwardly inclined relation to a central portion thereof, a transverse member slidably supported adjacent the forward end of said frame structure spring means connecting said transverse member with said frame structure in a manner biasing said transverse member rearwardly on said frame structure and affording relative movement of said transverse member lengthwise of said frame by leg movement of an occupant, means carried by said device in position for easy engagement by the hands of an occupant, said means including a post member secured to said device generally centrally of the forward portion of said seat section in upwardly extending relation thereto, whereby said device can be supported on a flat surface and the occupant thereof can rock the device longitudinally between a generally erect position and a position wherein the back-rest closely overlies the flat supporting surface and the occupant can also rock the device laterally, said rocking movement being achieved through shifting of the weight of the occupant including the shifting of his legs to cause movement of said transverse member which supports the occupant's feet.

3. An amusement device comprising a seat forming member having an integrally formed and essentially continuous seat and back-rest sections, said member having a generally convex outwardly facing surface which is curved along essentially the entire length of its longitudinal axis and also transversely across substantially the entire width, an elongated leg supporting frame structure fixed to said seat section in forwardly and upwardly inclined relation to a central portion thereof, a transverse member slidably supported adjacent the forward end of said frame structure, biasing means connecting said transverse member with said frame structure in a manner urging said member rearwardly on said frame structure and affording relative movement of said transverse member lengthwise of said frame by leg movement of an occupant, means carried by said device in position for easy engagement by the hands of an occupant, said means including a post member secured to said device generally centrally of the forward portion of said seat section in upwardly extending relation thereto and in a manner affording swinging movement of said means about a pair of transverse axes, whereby said device can be supported on a flat surface and the occupant thereof can rock the device longitudinally between a generally erect position and a position wherein the back-rest engages the flat supporting surface and the occupant can also rock the device laterally, said rocking movement being achieved through shifting of the weight of the occupant by means including movement of said means engaged by his hands and by movement of said transverse member which supports the feet of the occupant, and a rotatable member carried on one side of said device and movable into a position of engagement with the supporting surface, said rotatable member being operable to effect rotation of said device about a generally vertical axis.

4. An amusement device comprising an elongated seat forming member having a generally continuous seat and back-rest section with the latter extending upwardly a sufficient distance to support the head of the occupant, said member having its outwardly facing surface curved along essentially the entire length of its longitudinal axis and also transversely thereof to present a generally convex surface, whereby said device is to be supported on a flat surface in engagement therewith at essentially a point of contact between the two, a wheel disposed along one side of said member adjacent the forward edge of said seat section, means securing said wheel to said seat forming member in a manner providing for swinging of said wheel between engagement with said flat surface and an elevated position permitting free tilting movement of said member, said wheel in its ground-engaging position being rotatable about an axis which is disposed at an angle to the longitudinal axis of said seat forming member, and means for rotating said wheel, said rotatable wheel being operable to effect rotation of said device about a generally vertical axis.

References Cited by the Examiner
UNITED STATES PATENTS

| | | | |
|---|---|---|---|
| 2,129,176 | 9/1938 | Holman | 272—55 X |
| 2,930,430 | 3/1960 | Bloom | 272—58 X |
| 3,102,280 | 9/1963 | Williams | 272—1 X |

RICHARD C. PINKHAM, *Primary Examiner.*

F. B. LEONARD, *Assistant Examiner.*